S. WHEELER.
Pitman.
No. 134,117.  Patented Dec. 17, 1872.
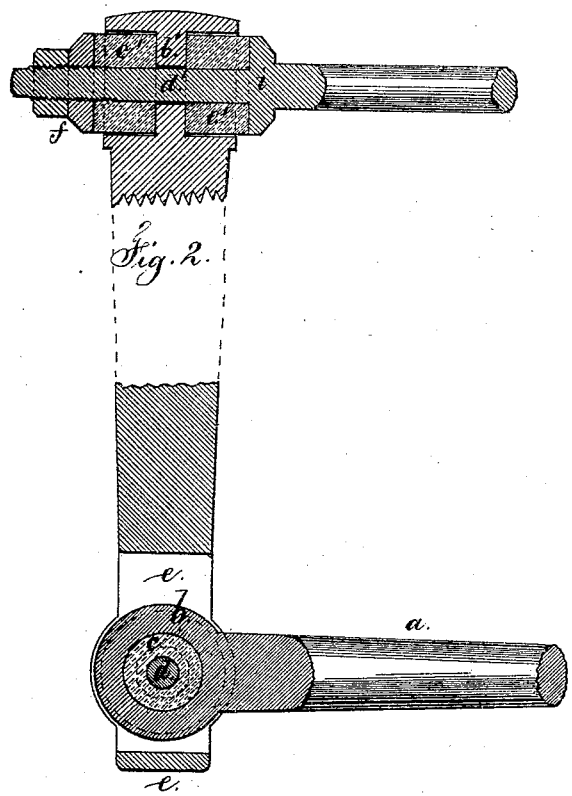
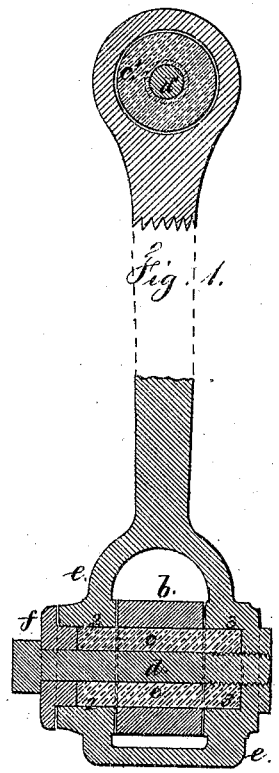

UNITED STATES PATENT OFFICE.

SETH WHEELER, OF ALBANY, NEW YORK.

IMPROVEMENT IN PITMEN.

Specification forming part of Letters Patent No. 134,117, dated December 17, 1872.

*To all whom it may concern:*

Be it known that I, SETH WHEELER, of Albany, in the State of New York, have invented an Improvement in Joints or Connections for Oscillating and Reciprocating Mechanical Movements; and the following is declared to be a correct description thereof.

In sieves for winnowing-machines, separators for thrashing-machines, cutter-bars of harvesting-machines, jig-saws, and numerous other articles there is a rapid reciprocation, and the inertia of the article moved has to be overcome and the article started in the other direction. This tends to wear the joints loose of the connecting-rods, oscillating levers, or other actuating parts, and produces a violent thumping noise that is very objectionable, and the parts are rapidly impaired. Besides this, the joints in machinery of this character are often numerous and difficult to oil, and hence they frequently become heated, and there is friction, wear, and loss of power.

My invention is made for the purpose of dispensing with lubrication at the joints, for preventing looseness and wear, for increasing the motion by the inertia, and by consequence lessening the length of crank or other motor, and saving loss of power both by friction and in overcoming the inertia of the reciprocating or oscillating body, because the inertia is availed of to aid in moving the body in the opposite direction. My invention consists in a spring around the joint pin or connection of the rod or lever in an oscillating or reciprocating mechanical movement, said spring being compressed into contact with the surface of the pin and the eye surrounding the same, so that the turning motion of the joint will not be a movement of one surface upon another, but it will be torsion of the spring itself, between the inner and the outer bearing-surfaces thereof; hence this device is not adapted to the surface of a crank-pin or any joint exposed to a rotary motion, but only to such joints as have a slight turning or vibrating motion that can be allowed of in the spring itself, and the alternations of direction cause the bolt of the joint to compress the spring at first one side and then the other, throwing the greater portion of the spring to first one side and then the other, and forming an elastic cushion to the bolt and eye of the joint that necessarily overcomes the inertia of the body that is moved, and allows of a greater movement of that body than would result from rigid joints; thereby in winnowers, harvesters, separators, &c., the throw of the crank can be lessened without decreasing the movement of the reciprocating part, the noise from concussion will be stopped and the expenditure of power materially lessened, besides avoiding the use of lubricating material, and rendering the parts much more durable.

In the drawing, Figure 1 is a section of the joint pins or bolts, arms, and springs; and Fig. 2 is a section at right angles to the same.

The rod or lever $a$ is made with an eye, $b$, of a size to surround the rubber spring $c$, through which the joint-pin $d$ passes for the purposes aforesaid, and the jaw $e$ of the other part of the joint is made with a hole through which the spring $c$ is passed, as at 2, and a recess, 3, for the end of the tube $c$ to enter. A cap, $f$, through which the joint-pin or bolt $d$ passes, serves to confine the rubber spring and expand the same sufficiently to fill the eyes and cause the spring to adhere sufficiently to the interior of the eyes and the exterior of the pin to prevent there being a motion between the metal and the surface of the rubber tending to wear the latter, and to insure the twisting or torsion of the spring itself by the turning movement of the parts as aforesaid, and the inertia of the article moved will cause a compression of the rubber in the before-described manner and effecting the objects named.

The India-rubber spring might be replaced by a wire helix having a corresponding action.

Where the reciprocation is in a different direction, I make the spring in two parts, as at $c'$, the ends being confined against the central division $b'$, and the joint-pin $d'$ having the shoulder $i$, cap and nut $f$ to regulate the pressure upon the springs. In this construction the rod or joint-pin $d'$ is free to play slightly endwise, or to turn partially around, or to vibrate laterally, because the springs $c'$ are not confined by the portion of the eye that surrounds them; but there will not be any sliding of one surface upon the other, the motion being allowed for by the springs.

I claim as my invention—

The jaw $e$, with an eye, 2, and socket 3, for the rubber tube $c$, in combination with the clamping-washer or cap $f$, pin $d$ and eye $b$, or their equivalents, substantially as set forth.

Signed by me this 26th day of April, A. D. 1872.

SETH WHEELER.

Witnesses:
STAATS WINNE,
JAMES C. WENDREM.